Patented Jan. 9, 1951

2,537,757

UNITED STATES PATENT OFFICE 2,537,757

PROCESS FOR THE PURIFICATION OF INSULIN

Siegwart Hermann, New York, N. Y.

No Drawing. Application June 21, 1947, Serial No. 756,331. In France July 13, 1939

Section 1, Public Law 690, August 8, 1946
Patent expires July 13, 1959

4 Claims. (Cl. 167—75)

My invention relates to an improved form of insulin and to methods of producing same. More particularly, it relates to insulin of greatly reduced convulsion producing effect at reduced blood sugar content, and to methods of producing same.

It has been established that insulin prepared by the methods currently employed for the production of the insulin used for therapeutic purposes is not a single pure compound, there having been separated from such insulins a fraction having an effect opposite to that of insulin, namely, the effect of increasing instead of decreasing the sugar content of the blood, while the material from which this fraction has been separated still retains its normal blood sugar reducing effect.

Starting from the idea that the spasmodic effects often produced by the application of the forms of insulin previously available could only be explained by the diminution of the sugar in the blood, and that according to all appearances spasmodic-producing substances could exist in ordinary insulin, I have developed methods permitting the elimination of these undesirable substances from the latter.

Suitable methods for the purification of ordinary insulins are described in the following examples. It is understood, however, that I am not limited to the exact modifications described therein but may modify each of the described procedures in accordance with customary practices.

1. Solutions of insulins of different origins were precipitated at the isoelectric point by means of dilute alkaline solutions or by means of buffers. The precipitates thus obtained were recovered by filtration or centrifugation, dissolved in dilute acids, and the precipitation procedure repeated until insulin precipitates were obtained from which the spasmodic producing substance had been substantially completely eliminated. The clear liquids from the first precipitations were found to have the property of increasing the sugar content of blood.

2. Solutions of insulins were precipitated at the isoelectric point, and after filtration or centrifugation, a clear liquid separated therefrom. In place of redissolving the precipitate and repeating the precipitation, as in the preceding example, the precipitate was washed several times with a liquid having a pH of 6.8 to 7.2. An opalescent liquid containing pure insulin was thus obtained.

3. More rapid processes consist of precipitating the insulin solutions by means of metal, oxides, or sulfides. Mercury, cadmium, and zinc compounds have given the best results in experiments on animals. The following two examples illustrate preparations based on this method:

(a) Four parts of insulin were dissolved in water and one part of an appropriate metal oxide added thereto. The precipitate thus obtained was separated from the liquid by filtration or centrifugation and the separated liquid was found to contain the hyperglycemic substance. The metallic insulin precipitate was then mixed with distilled water at a pH of 6.8 to 7.2, which extracts the pure insulin and frees it from its spasmodic component. By repetition of this procedure, the concentration of the opalescent solution can be increased. It should be noted that in this case it is the opalescent liquid which contains the pure insulin while the residue separated each time by filtration or centrifugation contains the spasmodic substance. It should further be noted that the use of water at a pH of 6.8 to 6.9 gives the purest insulin while a pH of 7.0 to 7.2 gives products containing more impurities.

(b) In a modification of the above process the metallic insulin precipitate was dissolved in dilute acid and to the solution thus obtained a dilute base added until the pecipitation was complete. The precipitate formed was then separated from the liquid by filtration or centrifugation. This procedure was repeated until the metallic insulin precipitate no longer contained the spasmodic substances which were left in the clear liquid. The latter may be used for the treatment of schizophrenia.

A series of experiments gave the following results, each material being tested on several hundred rabbits:

Different commercial insulins caused convulsions in 55% of the animals with doses of insulin which brought the sugar content of the blood to a value of 30 to 40 mg. per cent. As compared to this, insulin prepared in accordance with the methods of the present invention caused convulsions in only 12% of the animals of the experiment, using a dose of insulin sufficient to bring the sugar content to the same value of 30 to 40 mg. per cent.

By proceeding in a particularly careful manner, I have been able to obtain an insulin of such purity that even when the sugar content of the blood was lowered to 15 mg. per cent, no convulsions at all were noted.

The insulins produced in accordance with my new methods described above are not only pure and free from the spasmodic producing substance but also possess another property of great scientific and commercial importance, namely, its efficiency, which has been increased very appreciably. Depending upon the sources of the insulins, increases in efficiencies ranging from 20 to 80% have been obtained by my process. The efficiency of "Wellcome" insulin, for example, was increased by 20%, "Boots" and "Lily" insulins by 50%, "Novo" and "Norgine" insulins by 80%. This means, in the latter case, for example, that 100 units of my improved insulin give the same effect as 180 units of the present commercial "Novo" and "Norgine" insulins. It should be understood also that these evaluations are not based on the units declared by the respective firms, but on comparisons made with equivalent amounts of insulin made by my new process using the same animals. This unexpected increase in the efficiency is not only of commercial importance but it gives rise to a particularly pure product. The following specific example will serve to illustrate my new process:

5.5 mg. of dry commercial insulin correspond to 100 units. After treatment according to the methods described above 180 units are obtained, since by proceeding in accordance with the present invention the insulin is freed of hyperglycemic impurities whose presence otherwise counteracts the hypoglycemic effect of the insulin proper. Due to this elimination of the adversely acting impurities, it is possible to obtain a purified product whose effectiveness, expressed in terms of total available units, actually exceeds that of the original impure insulin. The purified insulin assayed about 100 units per 2 mg.

The stability of the insulins increases with their purity. Insulins prepared with particular care (100 units=2 mg.) must be sealed in ampoules under an atmosphere of nitrogen. Insulins a little less carefully prepared have been found to be stable during a period of one year's observation. Salts of lithium added in slight traces (1 gamma per 100 units) to insulin have shown a stabilizing effect.

Now having described my invention, what I claim is:

1. A method of producing pure insulin from insulin containing spasmodic and hyperglycemic impurities, which method comprises forming a dispersion of 4 parts of impure insulin and at least 1 part of zinc oxide in an aqueous medium, stirring the dispersion, separating the dispersion into a precipitate which contains insulin and zinc oxide and into a liquid portion which contains hyperglycemic impurities, redispersing the insulin-zinc oxide precipitate in a new portion of water having a pH between 6.8 and 7.2, and separating the resulting dispersion into a liquid portion containing purified insulin and into a precipitate containing spasmodic impurities and zinc oxide.

2. A method of producing pure insulin from insulin containing spasmodic and hyperglycemic impurities, which method comprises dissolving impure insulin in distilled water, mixing the resulting solution with zinc oxide in a ratio of about 1 part of zinc oxide per 4 parts of impure insulin, whereby a precipitate containing insulin and zinc oxide is formed, separating the precipitate from the aqueous portion wherein hyperglycemic impurities are dissolved, dispersing the precipitate in distilled water having a pH between 6.8 and 6.9, and separating the resulting dispersion into an aqueous extract of purified insulin and a precipitate containing undissolved insulin, zinc oxide and spasmodic impurities.

3. A method according to claim 2 wherein the separated precipitate containing undissolved insulin, zinc oxide and spasmodic impurities is at least once redispersed in distilled water having a pH between 6.8 and 6.9 and each such dispersion is again separated into an aqueous portion containing purified insulin and a precipitate containing undissolved insulin, zinc oxide and impurities.

4. A method according to claim 2 wherein the zinc oxide is added in the form of an aqueous dispersion.

SIEGWART HERMANN.

REFERENCES CITED

The following references are of record in the file of this patent:

UNITED STATES PATENTS

| Number | Name | Date |
|---|---|---|
| 2,091,178 | Gilbert | Aug. 24, 1937 |
| 2,115,418 | Dragstedt | Apr. 26, 1938 |
| 2,174,862 | Sahyun | Oct. 3, 1939 |
| 2,380,546 | Patterson | July 31, 1945 |
| 2,396,680 | Buxton | Mar. 19, 1946 |

FOREIGN PATENTS

| Number | Country | Date |
|---|---|---|
| 860,963 | France | Oct. 15, 1940 |

OTHER REFERENCES

"Insulin," Jensen N. Y. 1938, pages 24–30.